(12) United States Patent
Jancis

(10) Patent No.: US 6,790,888 B2
(45) Date of Patent: Sep. 14, 2004

(54) THERMOPLASTIC RESINS IN CONTACT WITH METALS OR METAL SALTS STABILIZED BY BLENDS OF DITHIOCARBAMATES AND METAL DEACTIVATORS

(75) Inventor: E. Harry Jancis, Naugatuck, CT (US)

(73) Assignee: Crompton Corporation, Middlebury, CT (US)

(*) Notice: Subject to any disclaimer, the term of this patent is extended or adjusted under 35 U.S.C. 154(b) by 47 days.

(21) Appl. No.: 09/859,111

(22) Filed: May 16, 2001

(65) Prior Publication Data

US 2002/0193472 A1 Dec. 19, 2002

(51) Int. Cl.[7] .................................................. C08L 5/39
(52) U.S. Cl. ........................ 524/201; 524/394; 524/399; 524/609; 524/349; 524/323; 524/440; 524/570
(58) Field of Search ................................. 524/201, 394, 524/399, 413, 202, 203, 323, 351, 353

(56) References Cited

U.S. PATENT DOCUMENTS

| | | | | |
|---|---|---|---|---|
| 3,001,969 A | | 9/1961 | Tholstrup et al. ......... | 260/45.75 |
| 3,322,802 A | | 5/1967 | Brooks et al. ............. | 260/429 |
| 3,376,250 A | * | 4/1968 | Newland et al. ............. | 260/41 |
| 3,700,750 A | * | 10/1972 | Yamanouchi et al. ....... | 260/874 |
| 3,710,009 A | * | 1/1973 | Hoeg et al. ........... | 174/120 AR |
| 3,819,410 A | * | 6/1974 | Kuckro et al. ............. | 117/232 |
| 3,832,481 A | * | 8/1974 | Boyd et al. ............. | 174/102 R |
| 3,948,854 A | * | 4/1976 | Roesenberger et al. .................... | 260/45.85 A |
| 3,962,178 A | * | 6/1976 | Masaki et al. ....... | 260/45.75 W |
| 4,035,325 A | * | 7/1977 | Poppe et al. .............. | 260/23 H |
| 4,038,247 A | * | 7/1977 | Muller et al. .............. | 260/45.9 |
| 4,173,493 A | * | 11/1979 | Kallas ......................... | 134/11 |
| 4,464,496 A | * | 8/1984 | Nemzek et al. ............... | 524/91 |
| 4,469,609 A | | 9/1984 | Bandlish et al. .............. | 252/19 |
| 4,575,522 A | * | 3/1986 | Breach et al. .............. | 523/220 |
| 4,622,352 A | * | 11/1986 | Djiauw et al. .............. | 523/200 |
| 4,632,950 A | * | 12/1986 | Kmiec et al. ............... | 524/202 |
| 4,663,079 A | * | 5/1987 | Yamaguchi et al. ........ | 252/512 |
| 4,731,949 A | * | 3/1988 | Poyner et al. ................ | 47/29 |
| 4,747,966 A | * | 5/1988 | Maeno et al. ................ | 252/512 |
| 4,797,511 A | | 1/1989 | Capolupo et al. ........... | 174/110 |
| 4,812,500 A | * | 3/1989 | Hayden ........................ | 524/99 |
| 4,837,259 A | * | 6/1989 | Chucta ....................... | 524/258 |
| 5,030,368 A | * | 7/1991 | Okorodudu ................ | 252/46.7 |
| 5,096,955 A | * | 3/1992 | Johnston et al. ............ | 524/398 |
| 5,216,056 A | * | 6/1993 | Suhoza ....................... | 524/202 |
| 5,284,890 A | * | 2/1994 | Collyer et al. .............. | 524/203 |
| 5,463,187 A | * | 10/1995 | Battle ....................... | 174/88 R |
| 5,624,982 A | * | 4/1997 | Chang et al. ................. | 524/91 |
| 6,080,929 A | * | 6/2000 | Fagouri et al. ............... | 174/23 |
| 6,277,907 B1 | * | 8/2001 | Gelbin ....................... | 524/196 |
| 6,359,230 B1 | * | 3/2002 | Hildreth ................. | 174/110 R |
| 6,469,088 B1 | * | 10/2002 | Lee ............................ | 524/451 |
| 2002/0193472 A1 | * | 12/2002 | Jancis ......................... | 524/96 |

FOREIGN PATENT DOCUMENTS

| | | | | |
|---|---|---|---|---|
| EP | 0 021 596 A1 | * | 1/1981 | ......... C07C/120/00 |
| EP | 0 080 409 | | 6/1983 | |
| EP | 0 328 788 | | 8/1989 | |
| GB | 1203442 | * | 8/1970 | ........... C08F/29/18 |
| GB | 1356107 | | 6/1974 | |
| JP | 46-37440 | | 11/1971 | |
| WO | WO 99/23154 A1 | * | 5/1999 | ........... C08K/13/02 |
| WO | WO 02/092685 A1 | * | 11/2002 | ............ C08K/5/39 |

OTHER PUBLICATIONS

EP 351428 B to Adams (Abstract only) Aug. 8, 1994.*
Hwahak Kwa Hwahak Kongop (1975), 18(6), 302–9.
Hawkins, W.L. in Polymer Degradation and Stabilization, Springer–Verlag, New York (1984),40–63.

* cited by examiner

Primary Examiner—David W. Wu
Assistant Examiner—Rip A. Lee
(74) Attorney, Agent, or Firm—Michael P. Dilworth; Paul Grandinetti

(57) ABSTRACT

A composition is disclosed that comprises:

(A) a thermoplastic resin;

(B) a member selected from the group consisting of metallic copper, cobalt, manganese, and salts of the foregoing in contact with said thermoplastic resin; and (C) a stabilizing amount of:

(1) a first stabilizer comprising at least one metal dithiocarbamate salt of the structure

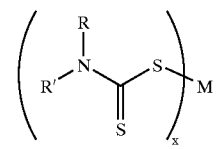

wherein
M is a divalent, trivalent, or tetravalent metal,
X is an integer of from 2 to 4 that equals the valence of M, and
the moiety

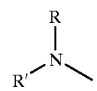

is the residue of any secondary amine that will react with carbon disulfide to form a dithiocarbamate; and (2) a second stabilizer comprising at least one metal deactivator.

26 Claims, No Drawings

THERMOPLASTIC RESINS IN CONTACT WITH METALS OR METAL SALTS STABILIZED BY BLENDS OF DITHIOCARBAMATES AND METAL DEACTIVATORS

BACKGROUND OF THE INVENTION

1. Field of the Invention

The present invention relates to the stabilization of thermoplastic resins that are in contact with metals or metal salts against thermo-oxidative degradation. More particularly, the present invention relates to the stabilization of thermoplastic resins that are in contact with metals or metal salts against thermo-oxidative degradation by use of blends of a dithiocarbamate, and a metal deactivator.

2. Description of Related Art

Manufacturers of plastic goods have experienced a long-standing problem in stabilizing plastic resins that, in use, come into contact with metals or metal salts. This problem is particularly acute in the wire and cable industry where thermoplastic sheaths or coatings are in contact with the underlying substrate, e.g., copper wire.

U.S. Pat. No. 3,001,969 discloses a thermoplastic heat-stable composition consisting primarily of a normally solid polypropylene, plus a stabilizing amount of a zinc di-lower alkyldithiocarbamate wherein the alkyl radicals contain at least two carbon atoms, especially zinc dibutyldithiocarbamate.

U.S. Pat. No. 3,322,802 discloses certain oxidized dithiocarbamates derived from divalent, trivalent, and tetravalent metals and methods for their preparation. The compounds are said to be high in biocidal activity and useful as industrial and agricultural bactericides and fungicides and as antifouling agents in paints. They are also said to be useful as vulcanization accelerators, as antioxidants in polymers, and as oxidation and wear inhibitors in lubricants.

U.S. Pat. No. 4,464,496 discloses a non-yellowing antioxidant-UV stabilizer combination especially useful in AES polymers comprising (A) at least one antioxidant selected from the group consisting of: (i) a thiodialkylene bis-(3,5-dialkyl-4-hydroxy) hydrocinnamate antioxidant; (ii) An N,N'-alkylene bis-(3,5-dialkyl-4-hydroxy) hydrocinnamamide antioxidant; (iii) an O,O-dialkyl-3,5-dialkyl-4-hydroxybenzyl phosphonate antioxidant; (iv) an oxamidobis alkyl (3,5)-dialkyl-4-hydroxyphenyl) propionate antioxidant; and (v) a [3-(3,5-dialkyl-4-hydroxyphenyl) propionamido]alkyl stearate antioxidant; and (B) a UV stabilizer package comprising: (vi) at least one UV stabilizer of the hindered amine type, with or without (vii) at least one UV absorber.

U.S. Pat. No. 4,469,609 discloses a stabilizing system useful for imparting resistance to oxidative breakdown comprising:
(1) a metal deactivator azine of the formula:

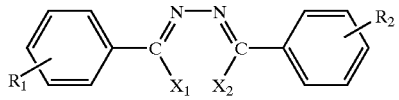

where: $R_1$ and $R_2$ can be hydrogen, alkyl with 1 to 12 carbon atoms, alkoxy with 1 to 12 carbon atoms, carbalkoxy with 1 to 12 carbon atoms, halogen, hydroxy, nitro and amino groups and $X_1$ and $X_2$ can be hydrogen, alkyl with 1 to 12 carbon atoms or di-, tri- or tetramethylene bridges to the aromatic ring;

(2) an amine;
(3) a metal compound selected from the group consisting of metals or metal salts; and
(4) a lubricating oil selected from the group consisting of mineral oils or synthetic hydrocarbon oils.

U.S. Pat. No. 4,797,511 discloses a composition stabilized against oxidative degradation comprising: a polyolefin, carbon black homogeneously incorporated in said polyolefin, a stabilizing amount of thiodiethylene bis(3,5-di-t-butyl-4-hydroxy)hydrocinnamate first stabilizer component incorporated into said polyolefin and a second stabilizer component of at least one amine antioxidant selected from the group consisting of a para-substituted aralkyl-substituted diphenylamine; a para-phenylenediamine and a polymerized dihydroquinoline incorporated into said polyolefin. U.S. Pat. No. 4,837,259 discloses polypropylene stabilized against oxidative degradation by the presence therein of a stabilizing amount of an antioxidant composition that comprises:

(a) at least one aralkyl-substituted diarylamine; and
(b) at least one sterically hindered phenol.

U.S. Pat. No. 6,080,929 discloses an improvement in a wire or cable system comprising a wire or cable portion, an insulation composition surrounding the wire or cable portion, a filler material surrounding the insulation composition and a jacket composition surrounding the filler material wherein either the insulation composition, the jacket composition, or both comprise at least one antioxidant, wherein the improvement comprises the inclusion in the filler material of a stabilizing mixture comprising at least two antioxidants, selected from at least two members of the group consisting of:

(a) metal dithiocarbamate salts,
(b) amine antioxidants, and
(c) sterically hindered phenolic antioxidants, wherein the stabilizing mixture is present in the filler material in an amount that is effective for the reduction of the oxidation of the cable filling material, thereby reducing deterioration of the jacket and/or insulation.

U.S. patent application Ser. No. 09/181,287, filed Oct. 28, 1998 discloses a composition comprising:

(A) a thermoplastic resin;
(B) carbon black; and
(C) a stabilizing amount of:
  (1) a first stabilizer comprising at least one metal dithiocarbamate salt of the structure

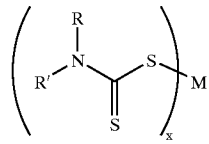

wherein
M is a divalent, trivalent, or tetravalent metal,
X is an integer of from 2 to 4 that equals the valence of M, and
the moiety

is the residue of any secondary amine that will react with carbon disulfide to form a dithiocarbamate; and (2) a second stabilizer selected from the group consisting of:
    (a) at least one amine antioxidant selected from the group consisting of:
        (i) a hydrocarbon-substituted diarylamine,
        (ii) a reaction product of a diarylamine and an aliphatic ketone,
        (iii) an N,N'-hydrocarbon substituted para-phenylenediamine, and
        (iv) a polymerized dihydroquinoline, and
    (b) at least one sterically hindered phenol.

U.K. Patent 1,356,107 discloses thermoplastic polymer compositions that degrade relatively rapidly on exposure to the environment. The compositions comprise a thermoplastic vinyl polymer or copolymer and at least one nonionic organo-soluble complex of a metal selected from iron, manganese, silver, palladium, molybdenum, chromium, tungsten, or cerium, and a complexing agent, either or both of the complex and complexing agent being an antioxidant, the complex being activatable by light of wavelength less than 330 nm and optionally heat to give a more photo-oxidatively active form of the metal in an amount such as to cause degradation of the polymer composition at the end of its desired life.

European Patent Publication Number 0 080 409 discloses rubber compounds that are useful in molding bags that resist oils at 140 degrees/skbar and contain epichlorohydrin polymers (100 parts), plasticizers (0.5 to 20 parts), reinforcing fillers (1 to 150 parts), metal stearates (0.5 to 7.5 parts), $Pb_3O_4$ (0.5 to 7.5 parts), stabilizers (0.5 to 5.5 parts), and vulcanizing agents (0.5 to 5.5 parts). Thus, a mixture of 100 parts polyepichlorohydrin, four parts stearic acid, 2.5 parts $Pb_3O_4$, one part zinc stearate, 2.5 parts N-isopropyl-N'-phenyl-p-phenylenediamine, one part $(Bu_2NCS_2)_2Ni$, 0.75 part $H_2N(CH_2)_6COOH$, and 30 parts carbon black was vulcanized 40 minutes at 160 degrees to give a rubber having a tensile strength of 18.7 MPa, elongation 900 percent, 300 percent modulus 6 MPa, and Shore hardness 61; compared with 16.3, 720, 7.6, and 64, respectively, after 24 hours in air at 140 degrees; and 14.3, 500, 9, and 60, respectively, after 24 hours in oil at 140 degrees.

European Patent Publication Number 0 328 788 discloses a composition comprising 100 parts by weight (pbw) of an aromatic vinyl compound-conjugated diene block copolymer and 1.0–5.0 pbw of a mixture of two or more compounds chosen from a dithiocarbamate derivative, a triazine derivative and a polyphenol compound, an adhesive composition containing it and a process for the preparation of said compositions by mixing the components in question.

JP 71037440 discloses the use of thiourea, Irganox RA-565, Soxinol PZ $\{(Me_2NCS_2)_2Zn\}$, Irganox RA-1093, and Soxinol M (2-mercaptobenzothiazole) as discoloration stabilizers for polypropylene fibers and films containing a phenolic antioxidant. For example, a polypropylene textile containing 0.25 percent Irganox RA-1010 and impregnated with a 5 g/l thiourea solution (wet pickup 80 percent) was not discolored by ammonia, while an unfinished textile became pink.

Hwahak Kwa Hwahak Kongop (1975), 18(6), 302–9 discloses the use of tetraethylthiuram disulfide (I) and tetramethylthiuram disulfide (II) as heat stabilizers for S-modified neoprene rubber. The scorch time linearly increased with increasing I and II content, while Ni bis(N, N-dibutyl dithiocarbamate) (III), N-phenyl-2-naphthylamine (IV), thiophenylamine (V) and BHT accelerated the crosslinking. III, IV, and V were good antioxidants and prevented dehydrochlorination. The rubber containing one percent I had a storability (plasticity decrease by 70 percent) of 1.5 years.

Hawkins, W. L. in *Polymer Degradation and Stabilization*, Springer-Verlag, New York (1984) describes using carbon black, sterically hindered phenols, dithiocarbamates, and amine antioxidants to stabilize polymers against thermal oxidation.

The disclosures of the foregoing are incorporated herein by reference in their entirety.

SUMMARY OF THE INVENTION

The present invention is characterized by a polymeric material that includes a stabilizing mixture comprising at least two components. The first component is a metal dithiocarbamate salt and the second component is a metal deactivator.

These stabilizing mixtures have been found to protect thermoplastic resins against polymer breakdown, as shown by extended initial oxidative induction times (OIT).

More particularly, the present invention is directed to a composition comprising:

(A) a thermoplastic resin;
(B) a member selected from the group consisting of metallic copper, cobalt, manganese, and salts of the foregoing in contact with said thermoplastic resin; and
(C) a stabilizing amount of:
    (1) a first stabilizer comprising at least one metal dithiocarbamate salt of the structure

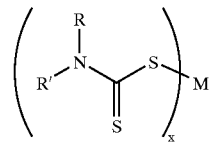

wherein
M is a divalent, trivalent, or tetravalent metal,
X is an integer of from 2 to 4 that equals the valence of M, and
the moiety

is the residue of any secondary amine that will react with carbon disulfide to form a dithiocarbamate; and
    (2) a second stabilizer comprising at least one metal deactivator.

In another aspect, the present invention is directed to a method for increasing the initial oxidative induction time of a thermoplastic resin that is in contact with a metal or metal salt selected from the group coonsisting of metallic copper, cobalt, manganese, and salts of the foregoing comprising adding to said resin a stabilizing amount of:

(A) a first stabilizer comprising at least one metal dithiocarbamate salt of the structure

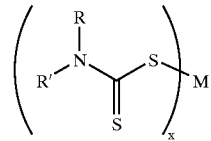

wherein
  M is a divalent, trivalent, or tetravalent metal,
  X is an integer of from 2 to 4 that equals the valence of M, and
  the moiety

is the residue of any secondary amine that will react with carbon disulfide to form a dithiocarbamate; and
  (B) a second stabilizer comprising at least one metal deactivator.

DESCRIPTION OF THE PREFERRED EMBODIMENTS

As stated above the present invention is directed to a composition comprising:
  (A) a thermoplastic resin;
  (B) a member selected from the group consisting of metallic copper, cobalt, manganese, and salts of the foregoing in contact with said thermoplastic resin; and
  (C) a stabilizing amount of:
    (1) a first stabilizer comprising at least one metal dithiocarbamate salt of the structure

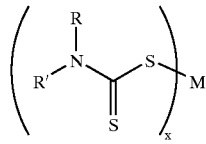

wherein
  M is a divalent, trivalent, or tetravalent metal,
  X is an integer of from 2 to 4 that equals the valence of M, and
  the moiety

is the residue of any secondary amine that will react with carbon disulfide to form a dithiocarbamate; and
    (2) a second stabilizer comprising at least one metal deactivator.

The thermoplastic resins that can be stabilized against oxidative degradation in the presence of metal or metal salts by employing mixtures of the above-described metal dithiocarbamate salts and metal deactivators include resins derived from ethylene including low density polyethylene (LDPE), linear low density polyethylene (LLDPE), medium density polyethylene (MDPE), high density polyethylene (HDPE), or other ethylene derived resins that have densities from 0.85 to 1.4 gm/cm$^3$; homopolymers derived from mono- and di-ethylenically unsaturated hydrocarbon monomers of $C_3$ and above, such as, polypropylene, polyisobutylene, polymethylbutene-1, polymethylpentene-1, polybutene-1, polyisobutylene, and the like; copolymers derived from two or more monomers, such as, ethylene-propylene copolymers having at least a majority of propylene, propylene-butene-1 copolymers, propylene-isobutylene copolymers, and the like, and blends thereof; polystyrenes; polyvinylhalides; and engineering thermoplastics, for example, polyamides, polyesters, polyphenyleneoxides, polyphenylenesulfides, polyacetals, aliphatic polyketone co or terpolymers, poly(ethersulfones), polycarbonates, liquid crystalline polymers, poly(etheretherketones), and poly(arylates). Preferably, the thermoplastic resin is selected from the group consisting of the resins derived from ethylene, as described above.

In the above structural formula for the metal dithiocarbamate salts that are used in the practice of the present invention, R and R' are hydrocarbon groups, for example, aryl or alkyl, that can be the same or different, and they can be joined through a methylene group or through an oxygen or sulfur atom to form, with the nitrogen, a heterocyclic ring. The hydrocarbon groups can be alkyl groups having from 1 to 12 carbon atoms, cycloalkyl groups, and hydrocarbon-substituted cycloalkyl groups having from 5 to 12 carbon atoms, or aryl, aralkyl, or alkaryl groups having from 6 to 12 carbon atoms. Joined together, the groups R and R' may form, with the nitrogen, heterocyclic rings containing four to five carbon atoms, zero to one oxygen atom, and zero to one sulfur atom. The total number of carbon atoms in the groups R and R' (attached to the same nitrogen atom) is preferably 24 or less. Typical radicals in the amine groups include, but are not limited to, phenyl, naphthyl, methyl, ethyl, propyl, butyl, pentyl, hexyl, heptyl, octyl, cyclopentyl, cyclohexyl, benzyl, phenethyl, and the like. Butyl and benzyl are preferred. The amine nitrogen can be included in, for example, morpholino, thiamorpholino, and piperidino groups. The foregoing terms should be understood to be generic in the sense of including structural isomers where appropriate, for example, isopropyl, t-butyl, neopentyl, 2-ethylhexyl, and the like.

The metal component of the dithiocarbamate, M, is preferably selected from the group consisting of the divalent metals copper, zinc, manganese, nickel, lead, cadmium, cobalt, tin(II), barium, and mercury; the trivalent metals iron(III) and bismuth; and the tetravalent metal tin(IV). It is preferred that M be a divalent metal, and more preferred that it be zinc.

It is most preferred that the first stabilizer be zinc dibenzyldithiocarbamate or zinc dibutyldithiocarbamate.

The metal deactivators that can be employed in the practice of the present invention include 2,2'-oxamidobis{ethyl-3-(3,5-di-t-butyl-4-hydroxyphenyl)propionate}; 1,2-bis(3,5-di-t-butyl-4-hydroxyhydrocinnamoyl)hydrazine; formyl salicyl hydrazide; N,N'-dibenzaloxalyl-dihydroazide; 3-salyicylamido-1,2,4-triazole; N,N'-disalicoyl adipoyl dihydrazide, and the like. Preferably, the deactivator is 2,2'-oxamidobis{ethyl-3-(3,5-di-t-butyl-4-hydroxyphenyl)propionate} or 1,2-bis(3,5-di-t-butyl-4-hydroxyhydrocinnamoyl)hydrazine.

Additionally, if desired, other antioxidants, such as hindered phenols, can be included in the compositions of the present invention. Such hindered phenols preferably have a molecular weight above 500 daltons. Preferred examples include 2,2'-methylenebis(4-methyl-6-t-butyl phenol); 2,2'-methylenebis(4-ethyl-6-t-butyl-phenol); 4-hydroxymethyl-2,6-di-t-butyl phenol; n-octadecyl-beta(3,5-di-t-butyl-4-hydroxyphenyl)propionate; 2-t-butyl-4,6-dimethyl phenol; 2,6-methyl-4-didodecyl phenol; tris(3,5-di-t-butyl-4-hydroxy isocyanurate, and tris(2-methyl-4-hydroxy-5-t-butylphenyl)butane.

More preferred are octadecyl-3,5-di-t-butyl-4-hydroxy hydrocinnarnate; tetrakis{methylene(3,5-di-t-butyl-4- hydroxy-hydrocinnamate)}methane; 1,3,5-tris(3,5-di-t-butyl-4-hydroxybenzyl)-s-triazine-2,4,6 (1H,3H,5H)trione; 1,3,5-tris(4-t-butyl-3-hydroxy-2,6-dimethylbenzyl)-s-triazine-2,4,6-(1H,3H,5H)trione; 1,3,5-trimethyl-2,4,6-tris (3,5-di-t-butyl-4-hydroxybenzyl)benzene; 3,5-di-t-butyl-4-hydroxyhydrocinnamic acid triester with 1,3,5-tris(2-hydroxyethyl)-5-triazine-2,4,6(1H,3H,5H)-trione; and bis (3,3-bis(4-hydroxy-3-t-butylphenyl)butanoic acid) glycolester.

Most preferred are the hindered phenols selected from the group consisting of tetrakis{methylene (3,5-di-t-butyl-4-hydroxy-hydrocinnamate)}methane; 1,3,5-trimethyl-2,4,6-tris(3,5-di-t-butyl-4-hydroxybenzyl)benzene; 1,2-bis(3,5-di-t-butyl-4-hydroxyhydrocinnamoyl)hydrazine; and 2,2'-oxamido bis-{ethyl-3-(3,5-di-t-butyl-4-hydroxyphenyl) }propionate.

The combined amounts of metal dithiocarbamate salts and any additional anti-oxidants, e.g., hindered phenol(s), incorporated into the thermoplastic resins of the present invention will, at a minimum, be that required to impart a significant level of stability against oxidative degradation. In general, such amounts can vary from about 0.01 to about 5.0, and preferably from about 0.3 to about 1.2, weight percent of the thermoplastic resin. Although combined amounts of the antioxidants in excess of about 5 weight percent can be employed, such amounts may have a deleterious effect on the physical and mechanical properties of the polymeric substrate, in which case they should ordinarily be avoided.

The relative proportions of metal dithiocarbamate salts to additional antioxidant, if present, can vary widely. In general, the ratios can vary from about 20:1 to about 1:20 and, preferably, from about 10:1 to about 1:10, and, more preferably, where hindered phenols are used, in the range of from about 1:3 to about 1:6, although ratios somewhat above and below these ranges can also be used with advantageous results.

The procedures employed to incorporate the stabilizers into the thermoplastic resin are not critical and, in general, follow any of the known procedures for incorporating additives into such resins. For example, these materials can be introduced into the thermoplastic resin as a premix or they can be maintained separately and added to the resin simultaneously or sequentially and then homogeneously distributed throughout the polymer by milling, extrusion blending, or some other mechanical working procedure. Either the first stabilizer or the second stabilizer or both can be added to the thermoplastic resin by way of a preconcentrate or in a carrier system, for example, in a suitable solvent or co-solvent.

Following common practice, other additives can be introduced into the resin prior to, during, and/or following addition of the stabilizers. Such additives include other stabilizers, colorants, reinforcements, fillers, antistatic agents, lubricants, plasticizers, and the like, present in the customary amounts.

For example, the present invention may also include the presence of carbon black in the polymer. The carbon black is useful, inter alia, for providing resistance to the effects of ultra-violet light. It can be present in a range of from about 0.01 to 20 percent by weight, more preferably from about 0.01 to 10 percent by weight, and most preferably from about 0.1 to about 5 percent weight.

Various features and aspects of the present invention are illustrated further in the examples that follow. While these examples are presented to show one skilled in the art how to operate within the scope of the invention, they are not intended in any way to serve as a limitation upon the scope of the invention.

OXIDATIVE INDUCTION TIMES

Circular discs 0.25 inch in diameter are cut from 0.25 mm films of the material to be tested and placed in aluminum pans for use in a Perkin-Elmer DSC-2C type differential scanning calorimeter (DSC). The test chamber of the DSC calorimeter is purged with nitrogen flowing at 50 cc/min and equilibrated at 70° C. for two minutes. The temperature is increased to 200° C. at a rate of 20° C. and held isothermally for 2.0 minutes. This is followed by a change to oxygen at a flow rate of 50 cc/min with an isothermal hold for 120 minutes to induce thermal-oxidative degradation. Oxidative Induction Time (OIT) is the time span in minutes between reaching the isocratic temperature when the oxygen environment is introduced and the time at which the DSC detects the onset of oxidation.

EXAMPLES

A standard formulation was prepared by weighing out 60 grams of high density polyethylene, 60 mg of stabilizer, and 300 mg of powdered copper (commercially available from Aldrich), followed by dry blending. The mixture was then compounded in a Brabender Mixer for 15 minutes at 185° C. The plastic mass was removed from the mixer and pressed for five minutes at 177° C. into a 10 mil film. The film was exposed in an oven at 100° C. (If LDPE had been used, the temperature would have been 90° C.) Small sections of the film were removed and the OIT measurements were collected on a Mettler DSC at 200° C. The OIT results are described in Table 1. The initial OIT data units are minutes.

TABLE 1

| Sample | 1 | 2 | 3 | 4 | 5 | 6 |
|---|---|---|---|---|---|---|
| HDPE (Solvay) | 60 | 60 | 60 | 60 | 60 | 60 |
| Copper Powder | 0.3 | 0.3 | 0.3 | 0.3 | 0.3 | 0.3 |
| Naugard XL-1 | 0.06 | 0.03 | — | 0.06 | 0.03 | — |
| Naugard 10 | — | 0.03 | — | — | 0.03 | — |
| Irganox MD-1024 | — | — | 0.06 | — | — | 0.06 |
| Butazate | — | — | — | 0.01 | 0.01 | 0.01 |
| Initial OIT | 28.7 | 32.5 | 35 | 71 | 72 | 68 |

Naugard XL-1 is 2,2'-oxamidobis{ethyl-3-(3,5-di-t-butyl-4-hydroxyphenyl)propionate}.
Naugard 10 is tetrakis{methylene(3,5-di-t-butyl-4-hydroxy-hydrocinnamate)} methane.
Irganox MD-1024 is 1,2-bis(3,5-di-t-butyl-4-hydroxyhydrocinnamoyl)hydrazine.
Butazate is zinc dibutyldithiocarbamate.

As these data show, the combination of metal deactivators and metal dithiocarbamate salts show significant improvement in values for initial OIT (Samples 4, 5, and 6) as compared to similar formulations containing no metal dithiocarbamate salt (Samples 1, 2, and 3).

In view of the many changes and modifications that can be made without departing from principles underlying the invention, reference should be made to the appended claims for an understanding of the scope of the protection afforded the invention.

What is claimed is:
1. An article of manufacture comprising:
    (A) a composition consisting of:
        (1) a thermoplastic resin; and
        (2) a stabilizing amount of:
            (a) a first stabilizer selected from the group consisting of metal dithiocarbamate salts of the structure

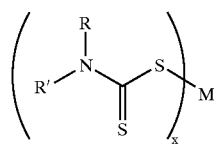

wherein
M is a divalent, trivalent, or tetravalent metal,
X is an integer of from 2 to 4 that equals the valence of M, and
the moiety

is the residue of any secondary amine that will react with carbon disulfide to form a dithiocarbamate;
(b) a second stabilizer selected from the group consisting of 2,2'-oxamidobis{ethyl-3-(3,5-di-t-butyl-4-hydroxyphenyl)propionate} and 1,2-bis(3,5-di-t-butyl-4-hydroxyhydrocinnamoyl)hydrazine; and, optionally,
(c) a third stabilizer selected from the group consisting of sterically hindered phenols; and
(B) a member selected from the group consisting of metallic copper, metallic cobalt, and metallic manganese, in direct contact with said composition.

2. The article of claim 1 wherein the sterically hindered phenol is selected from the group consisting of:
1,3,5-trimethyl-2,4,6-tris(3,5-di-t-butyl-4-hydroxybenzyl)benzene;
1,3,5-tris(3,5-di-t-butyl-4-hydroxybenzyl)-s-triazine-2,4,6(1H,3H,5H)trione;
1,3,5-tris(4-t-butyl-3-hydroxy-2,6-dimethylbenzyl)-s-triazine-2,4,6-(1H,3H,5H)trione;
2-t-butyl-4,6-dimethyl phenol; 2,2'-methylenebis(4-ethyl-6-t-butyi-phenol);
2,2'-methylenebis(4-methyl-6-t-butyl phenol);
3,5-di-t-butyl-4-hydroxyhydrocinnamic acid triester with 1,3,5-tris(2-hydroxyethyl)-5-triazine-2,4,6(1H,3H,5H)-trione; bis(3,3-bis(4-hydroxy-3-t-butylphenyl)butanoic acid)glycolester;
4-hydroxymethyl-2,6-di-t-butyl phenol;
tetrakis{methylene(3,5-di-t-butyl-4-hydroxyhydrocinnamate)}methane;
and 1,3,5-trimethyl-2,4,6-tris(3,5-di-t-butyl-4-hydroxybenzyl)benzene.

3. The article of claim 1 wherein the thermoplastic resin is a polyolefin resin.

4. The article of claim 3 wherein the polyolefin resin is selected from the group consisting of polyethylene, polypropylene, polyisobutylene, polymethylbutene-1, polymethylpentene-1, polybutene-1, polyisobutylene, ethylene-propylene copolymers having a majority of propylene, propylene-butene-1 copolymers, and propylene-isobutylene copolymers.

5. The article of claim 1 wherein R and R' have a combined number of carbon atoms of 24 or less.

6. The article of claim 5 wherein R and R' are independently selected from the group consisting of phenyl, naphthyl, methyl, ethyl, propyl, butyl, pentyl, hexyl, heptyl, octyl, cyclopentyl, cyclohexyl, benzyl, and phenethyl.

7. The article of claim 1 wherein R and R' are joined together through a methylene group, an oxygen atom, or a sulfur atom to form, with the nitrogen, a heterocyclic ring.

8. The article of claim 7 wherein the heterocyclic ring is morpholino, thiamorpholino, or piperidino.

9. The article of claim 1 wherein M is selected from the group consisting of the divalent metals copper, zinc, manganese, nickel, lead, cadmium, cobalt, tin(II), barium, and mercury, the trivalent metals iron(III) and bismuth, and the tetravalent metal tin(IV).

10. The article of claim 9 wherein M is zinc.

11. The article of claim 1 wherein the first stabilizer is zinc dibenzyldithiocarbamate.

12. The article of claim 1 wherein the first stabilizer is zinc dibutyldithiocarbamate.

13. The article of claim 2 wherein the sterically hindered phenol is tetrakis{methylene(3,5-di-t-butyl-4-hydroxyhydrocinnamate)}methane.

14. A method for increasing the initial oxidative induction time of a thermoplastic resin composition that is in direct contact with a member selected from the group consisting of metallic copper, metallic cobalt, and metallic manganese, comprising adding to said resin composition a stabilizing composition consisting of a stabilizing amount of:
(A) a first stabilizer selected from the group consisting of metal dithiocarbamate salts of the structure

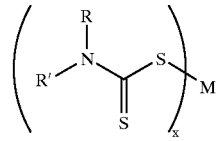

wherein
M is a divalent, trivalent, or tetravalent metal,
X is an integer of from 2 to 4 that equals the valence of M, and
the moiety

is the residue of any secondary amine that will react with carbon disulfide to form a dithiocarbamate; and
(B) a second stabilizer selected from the group consisting of 2,2'-oxamidobis{ethyl-3-(3,5-di-t-butyl-4-hydroxyphenyl)propionate} and 1,2-bis(3,5-di-t-butyl-4-hydroxyhydrocinnamoyl)hydrazine; and, optionally,
(C) a third stabilizer selected from the group consisting of sterically hindered phenols.

15. The method of claim 14 wherein the sterically hindered phenol is selected from the group consisting of:
1,3,5-trimethyl-2,4,6-tris(3,5-di-t-butyl-4-hydroxybenzyl)benzene;
1,3,5-tris(3,5-di-t-butyl-4-hydroxybenzyl)-s-triazine-2,4,6-(1H,3H,5H)trione;
1,3,5-tris(4-t-butyl-3-hydroxy-2,6-dimethylbenzyl)-s-triazine-2,4,6-(1H,3H,5H)trione;
2-t-butyl-4,6-dimethyl phenol; 2,2'-methylenebis(4-ethyl-6-t-butyl-phenol);
2,2'-methylenebis(4-methyl-6-t-butyl phenol);
3,5-di-t-butyl-4-hydroxyhydrocinnamic acid triester with 1,3,5-tris(2-hydroxyethyl)-5-triazine-2,4,6(1H,3H, 5H)-trione; bis(3,3-bis(4-hydroxy-3-t-butylphenyl) butanoic acid)glycolester;

4-hydroxymethyl-2,6-di-t-butyl phenol;

tetrakis{methylene(3,5-di-t-butyl-4-hydroxy-hydrocinnamate)}methane; and 1,3,5-trimethyl-2,4,6-tris(3,5-di-t-butyl-4-hydroxybenzyl)benzene.

16. The method of claim 14 wherein the thermoplastic resin is a polyolefin resin.

17. The method of claim 16 wherein the polyolefin resin is selected from the group consisting of polyethylene, polypropylene, polyisobutylene, polyinethylbutene-1, polymethylpentene-1, polybutene-1, polyisobutylene, ethylene-propylene copolymers having a majority of propylene, propylene-butene-1 copolymers, and propylene-isobutylene copolymers.

18. The method of claim 14 wherein R and R' have a combined number of carbon atoms of 24 or less.

19. The method of claim 18 wherein R and R' are independently selected from the group consisting of phenyl, naphthyl, methyl, ethyl, propyl, butyl, pentyl, hexyl, heptyl, octyl, cyclopentyl, cyclohexyl, benzyl, and phenethyl.

20. The method of claim 14 wherein R and R' are joined together through a methylene group, an oxygen atom, or a sulfur atom to form, with the nitrogen, a heterocyclic ring.

21. The method of claim 20 wherein the heterocyclic ring is morpholino, thiamorpholino, or pipendino.

22. The method of claim 14 wherein M is selected from the group consisting of the divalent metals copper, zinc, manganese, nickel, lead, cadmium, cobalt, tin(II), barium, and mercury, the trivalent metals iron(III) and bismuth, and the tetravaient metal tin(IV).

23. The method of claim 22 wherein M is zinc.

24. The method of claim 14 wherein the first stabilizer is zinc dibenzyldithiocarbamate.

25. The method of claim 14 wherein the first stabilizer is zinc dibutyldithiocarbamate.

26. The method of claim 15 wherein the sterically hindered phenol is tetrakis{methylene(3,5-di-t-butyl-4-hydroxy-hydrocinnamate)}methane.

* * * * *